April 24, 1962 R. W. BOND 3,031,662
AUTOMATIC LANDING SYSTEM
Filed July 2, 1956 3 Sheets-Sheet 1

INVENTOR.
ROBERT W. BOND
BY William P. Lane
ATTORNEY

April 24, 1962  R. W. BOND  3,031,662
AUTOMATIC LANDING SYSTEM
Filed July 2, 1956  3 Sheets-Sheet 3

*INVENTOR.*
ROBERT W. BOND
BY
*William R Lane*
ATTORNEY

United States Patent Office 3,031,662
Patented Apr. 24, 1962

3,031,662
AUTOMATIC LANDING SYSTEM
Robert W. Bond, Whittier, Calif., assignor to
North American Aviation, Inc.
Filed July 2, 1956, Ser. No. 595,330
9 Claims. (Cl. 343—108)

This invention relates to an automatic landing system and more particularly to a control system utilizing the sum of altitude, altitude rate, and acceleration signals to control the pitch angle of an aircraft in a predetermined flare path.

With the advent of high speed aircraft and pilotless missiles, the need for an automatic landing system has arisen. Landings in fog or rain, landings at night, landings with heavy pay loads, and other landings under adverse conditions, must be accomplished with reliability. In order to automatically land an aircraft, the aircraft must be accurately controlled under all conditions to provide a smooth landing. In addition, an automatic landing system, in order to meet requirements for reliability, must contain control equipment which is insensitive to outside disturbances normally encountered in landings.

In the past, various control systems have been used to control aircraft in flight. These systems use combinations of altitude and other parameters to guide the aircraft while in the air. These control systems, while accurate enough for conditions encountered in flight, are wholly unsatisfactory in a system which must land an airplane in such a way as to provide a smooth landing flare path as the airplane approaches the ground level. Because the margin of error in automatically landing an aircraft is very narrow, due to the requirements of the smooth touchdown for most aircraft, present control systems are inadequate.

This invention contemplates an automatic landing system for an aircraft which provides a smooth landing flare path and an accurate touchdown by a control system which is independent of operating environment. In order to safely land an aircraft within its load limits and other design requirements for landing, a flare path must be provided which accurately controls the rate of descent of the aircraft in proportion to the altitude. If the rate of descent of an aircraft is controlled in proportion to altitude, an exponential flare path may be obtained which provides the necessary flare path to meet design requirements. A flare path described by the equation $$h + \frac{k_1 dh}{dt} + \frac{k_2 d^2 h}{dt^2} = 0$$

wherein $h$ is altitude and $$\frac{dh}{dt}$$

is altitude rate, and $$\frac{d^2 h}{dt^2}$$

is the acceleration, and $k_1$ and $k_2$ are predetermined constants, provides a path in which the altitude of the aircraft is reduced to zero in an exponential function of time. In other words, an altitude signal and its first two derivatives are summed to obtain an error signal which controls the aircraft and causes it to conform to an exponential curve. In the preferred embodiment of this invention the altitude and altitude rate signals of the above equation are obtained from a radio altimeter, and the acceleration signal is obtained from a vertical accelerometer. These three signals are then combined to provide an indication to the automatic control system of the relation of the actual landing path described by the aircraft to the theoretical curve described by the altitude equation. An altitude and an altitude rate signal may be obtained from a radio altimeter which provides a signal proportional to the theoretical required curve. However, this signal is sensitive to terrain irregularities which induce considerable noise into the system. By obtaining the acceleration signal from a vertical accelerometer, a device independent of the radio altimeter, a smoother control is realized due to the dynamic stabilization, and minimum noise is obtained from the accelerometer which is insensitive to terrain irregularities. The system as contemplated causes the aircraft to change its pitch attitude in response to an error signal received from the integral of the combined altitude, altitude rate, and acceleration signals, in order to approach zero error in the exponential curve, thereby providing a smooth landing for the aircraft.

It is therefore an object of this invention to provide an automatic landing control system for aircraft.

It is another object of this invention to provide an automatic landing control system for aircraft relatively independent of environment.

It is a further object of this invention to provide means for creating an electrical signal proportional to the sum of the altitude, altitude rate, and acceleration of an aircraft.

It is a further object of this invention to provide means for controlling the landing of an aircraft in a path determined by the equation $$h + \frac{k_1 dh}{dt} + \frac{k_2 d^2 h}{dt^2} = 0$$

wherein $h$ represents altitude, $$\frac{dh}{dt}$$

represents altitude rate, and $$\frac{d^2 h}{dt^2}$$

represents acceleration.

It is still another object of this invention to provide a control system for landing aircraft which contains an altitude signal, an altitude rate signal, an acceleration signal, and means to eliminate transient effects from said signals to produce an error signal which causes said aircraft to land in a smooth path.

It is a further object of this invention to provide a system for controlling an airplane in pitch to accomplish an automatic landing.

It is another object of this invention to provide means for controlling the rate of descent of an aircraft.

Other objects of invention will become apparent from the following description taken in connection with the accompany drawings, in which FIG. 1 is a block diagram of this invention;

Figure 1:
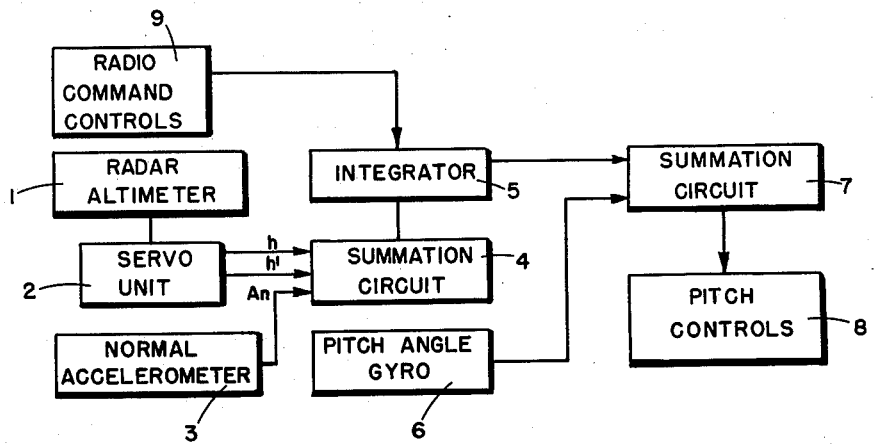

In FIG. 1 radar altimeter 1 is mounted in the aircraft. Any of the well-known radar altimeters may be used, but a frequency modulated radar altimeter is preferred because of its characteristic of obtaining accurate low level altitude information required in the landing system.

Radar altimeter 1 provides a continuous and smooth altitude signal to servo unit 2. Servo unit 2 differentiates the altitude signal and produces an altitude rate signal. The altitude rate signal along with the altitude signal is fed into summation circuit 4 which combines the altitude and altitude rate signals with an acceleration signal received from normal accelerometer 3. Summation circuit 4 supplies an output error signal to integrator 5 equal to the sum of altitude, altitude rate, and acceleration. Radio command controls 9 supplies a signal equal to the pitch angle command at initiation of the flare path. Integrator 5 integrates the output error signal from summing circuit 4 and the initial pitch angle command signal from radio command controls 9 to provide a pitch angle command signal to summation circuit 7. By performing the function of integration, integrator 5 provides smoothing. Receiving signals from summation circuit 4 which are uneven and erratic, integrator 5 smooths these signals by integrating them. Gyro 6 measures the actual pitch angle of the aircraft and feeds the signal into summation circuit 7. Summation circuit 7 compares the output from integrator 5 with the signal from gyro 6 and provides an output signal proportional to the difference between the actual pitch angle provided by gyro 6 and the command pitch angle provided by integrator 5 to pitch controls 8.

Figure 2:
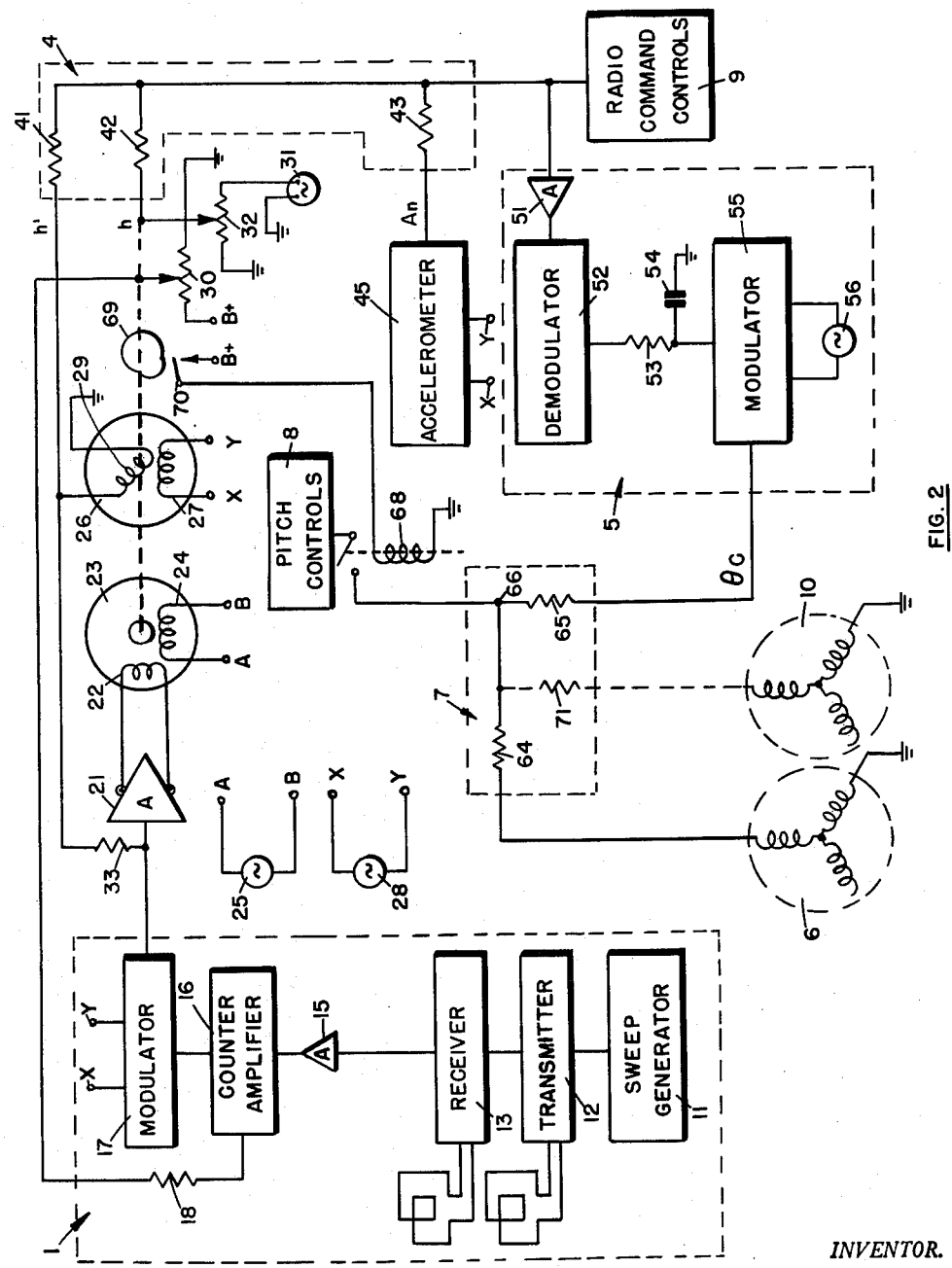
FIG. 2 is a schematic diagram of the preferred embodiment of this invention.

In FIG. 2 a schematic diagram of the preferred embodiment of the control system is shown. In radar altimeter 1, sweep generator 11 causes transmitter 12 to emit a frequency modulated radio signal. The radio signal travels to the reflecting surface on the ground and returns to receiver 13 where the received signal is compared with the transmitted signal and receiver 13 emits an output proportional to the altitude. A difference frequency proportional to the elapsed time it takes the transmitted signal to reach the receiver is fed by receiver 13 to amplifier 15, which amplifies the audio signal whose frequency is proportional to altitude, and feeds it into counter amplifier 16 (explained hereinafter) which counts the signals and provides a unidirectional output to modulator 17. Modulator 17 converts the unidirectional output of counter amplifier 16 to a 400 cycle suppressed-carrier modulated signal. A.-C. source 28 provides the 400 cycle carrier signal through terminals X and Y. The A.-C. output of modulator 17 is fed into servo amplifier 21 which amplifies the signal and provides the input to control winding 22 of servo motor 23. In quadrature with control winding 22 is winding 24 which receives an A.-C. signal from source 25 through terminals A and B. A.-C. source 25 is 90 degrees out-of-phase with A.-C. source 28. Tachometer generator 26 is connected to be driven by motor 23. Alternating current source 28 through terminals X and Y provides the signal to winding 27 of generator 26. The output of winding 29 of generator 26 is proportional to the change in altitude rate. Resistor 41 of summation circuit 4 is connected to winding 29. A feedback signal is provided from winding 29 through resistor 33 to the input of servo amplifier 21 to provide for damping of the servo system. A D.-C. voltage source is connected across potentiometer 30 which is mechanically driven by motor 23. The voltage upon the movable arm of potentiometer 30 is electrically connected through resistor 18 to counter amplifier 16 to provide a stabilizing feedback signal to amplifier 16. A.-C. source 31, which is in phase with A.-C. source 28 but of less voltage, is connected across potentiometer 32 which is mechanically driven by motor 23, and the voltage upon movable arm of potentiometer 32 is electrically connected to resistor 42 of summation circuit 4. A.-C. source 28 through terminals X and Y provides the voltage for normal accelerometer 45 which produces a voltage proportional to acceleration and feeds the signal to resistor 43 of summation circuit 4. The values of resistors 41, 42 and 43 are predeterminately selected so as to provide the proper altitude, altitude rate, and acceleration. These constants $k_1$ and $k_2$ are empirically determined for the individual aircraft to provide a glide path which is slightly over damped from critical. The relative values of resistors 41, 42 and 43 achieve the values of constants $k_1$ and $k_2$. The output of resistors 41, 42 and 43 are combined in summation circuit 4 to produce a landing system error signal which is fed to the input of amplifier 51 of integrator 5. Radio command controls 9 provides an initial pitch angle command signal to amplifier 51 in order to insure that the output of integrator 5 is supplying an appropriate pitch command signal to summation circuit 7 prior to initiation of landing flare control. Amplifier 51 amplifies the combined signal and feeds the output signal into demodulator 52. The D.-C. output of demodulator 52 is fed through resistor 53 and capacitor 54 to provide an integrated signal to modulator 55. The modulated output of modulator 55 is a pitch angle command signal which is fed into resistor 65. Pitch angle gyro 6 provides a signal proportional to present pitch angle to resistor 64. The outputs of resistors 64 and 65 are connected in common to terminal 66 which is connected to one contact of normally open relay 68. The other contact of relay 68 is connected to pitch controls 8. The control coil of relay 68 is connected to be actuated by cam 69. Cam 69 is connected to be driven by servo motor 23 and actuates relay 68 by closing switch 70 when the aircraft reaches a predetermined altitude at which the landing flare is to be initiated. In order to provide anticipation of pitch a rate gyro 10 may be included to provide signals through resistor 71 in summing circuit 7.

Figure 3:
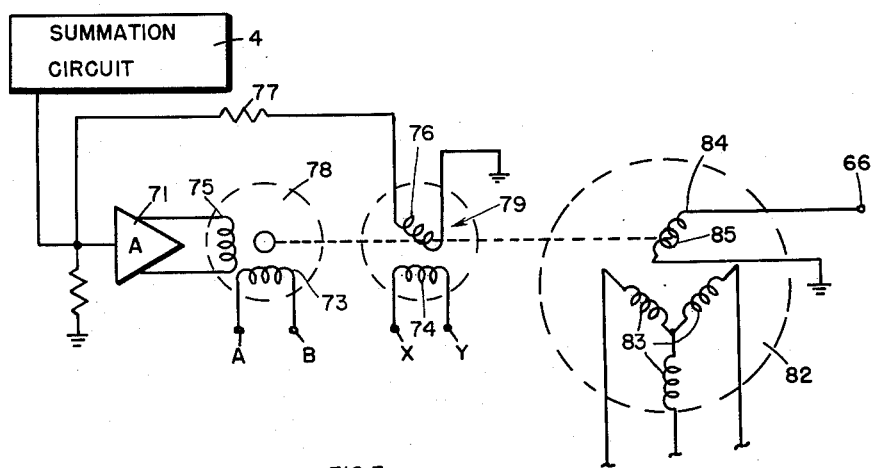
FIG. 3 is a circuit diagram showing another embodiment utilizing a mechanical integrator.

Integrator 5 is shown as an electronic integrator in FIG. 2, the preferred embodiment of this invention. Integrator 5 in another embodiment of this invention may be an electro-mechanical system for integrating the output of summation circuit 4. In FIG. 3, the output of summation circuit 4, the landing system error signal (FIG. 1) is fed from summation circuit 4 to amplifier 71 which drives servo motor 78 through control winding 75. Voltage source 25 through terminal A and B provides a signal to quadrature winding 73 of motor 78. Connected to be driven by motor 78 is tachometer generator 79 with winding 74 supplied by voltage source 28 through terminals X and Y. Winding 76 is connected through resistor 77 to the input of amplifier 71 to provide rate feedback. Synchro control transformer 82 has its rotor 85 connected to be driven by servo motor 78. The position of rotor 85 is proportional to the pitch angle command. Windings 83 of control transformer 82 are connected to the pickoff windings of the pitch angle gyro 6 (FIG. 2). The voltage induced in winding 84 is proportional to the position of rotor 85 and the voltage induced in windings 83. Winding 84 of synchro control transformer 82 is connected to terminal 66 which provides the pitch angle error signal to pitch controls 8 shown in FIG. 1.

Figure 4:
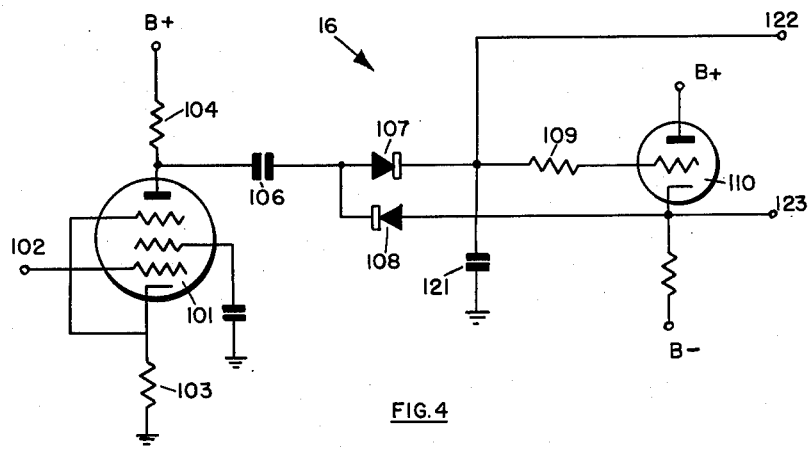
FIG. 4 is a circuit diagram of the counter amplifier used in the system.

In FIG. 4 a circuit diagram of counter amplifier 16 of FIG. 2 is shown. The output of amplifier 15 of FIG. 2 is connected to the grid of pentode 101 from terminal 102. The cathode of pentode 101 is connected through resistor 103 to ground and directly connected to the suppressor grid of pentode 101. The plate circuit of pentode 101 is supplied with a B+ voltage through resistor 104. Pentode 101 acts as a counter limiter circuit. The output of pentode 101 taken from its plate is connected to capacitor 106. The output of capacitor 106 is connected to the counter circuit provided by diodes 107 and 108. The cathode of diode 107 is connected in common with the anode of diode 108 to the output of capacitor 106. The anode of diode 107 is connected through resistor 109 to the grid of triode 110. The cathode of diode 108 is directly connected to the cathode of triode 110. Capacitor 121 has one end connected to ground and the other end connected to the junction point between diode 107 and resistor 109. Also connected to this junction point is output terminal 122. Output terminal 123 is connected to the cathode of triode 110. Output terminal 123 provides the input signal to modulator 17 as shown in FIG. 2. Output terminal 122 receives the feedback signal from resistor 18 as shown in FIG. 2. In operation, the voltage on the plate of pentode 101 varies between zero and a predetermined positive potential at a frequency which is proportional to altitude according to the signal received from terminal 102. When the voltage changes from zero to positive, capacitor 106 is charged through diode 108 and the cathode of triode 110. When the potential at the plate of pentode 110 changes from positive to zero, the charge on capacitor 106 is transferred to capacitor 121. The voltage across capacitor 121 is compared with the feedback signal received from the servo unit at terminal 122. When the voltages are equal, the output from the cathode of triode 110 connected through terminal 123 to drive the servo unit is zero.

Figure 5:
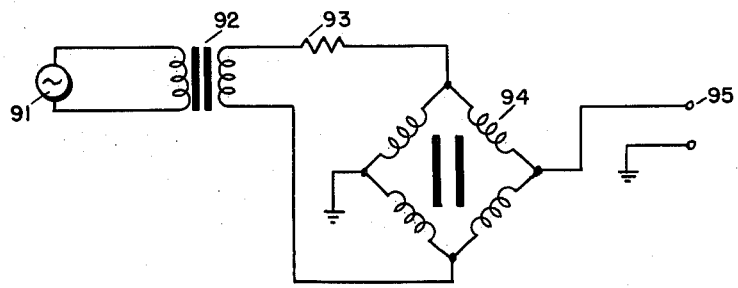
FIG. 5 is a circuit diagram of a typical accelerometer.

In FIG. 5 a typical vertical accelerometer is shown. An A.-C. signal source 91 is connected to the input of transformer 92. The output of transformer 92 is connected through resistor 93 to the input of a variable inductance bridge 94 whose inductance is varied by a moving ferromagnetic core, the displacement of which is proportional to acceleration. When bridge 94 is unbalanced an electrical voltage proportional to the linear acceleration of the aircraft in the sensitive direction of the acceleration is generated at terminal 95. This sensitive direction may be made parallel to the yaw axis of the aircraft in order to measure vertical acceleration.

Referring again to FIG. 2, the preferred embodiment of this invention, in operation the altitude of the aircraft is continuously measured by radar altimeter 1. An electrical signal transmitted by transmitter 12 controlled by sweep generator 11 is reflected from the ground and mixed in receiver 13 with a portion of the signal transmitted. The frequency of the signal obtained at the output of receiver 13 is the instantaneous frequency difference between the transmitted signal and received signal which is proportional to the altitude of the aircraft or missile above the ground. Audio amplifier 15 amplifies the audio frequency output from receiver 13 and drives counter amplifier 16. Counter amplifier 16 converts the variable frequency altitude information received from amplifier 15 to a varying D.-C. voltage of reversible polarity which becomes the input to modulator 17. Modulator 17 converts the signal to a 400 cycle suppressed-carrier modulated signal which is fed into amplifier 21 of servo unit 2. Amplifier 21 provides the A.-C. source to control winding 22 of servo motor 23 and drives motor 23 in accordance with the signal received from modulator 17. The wiper of potentiometer 30 mechanically driven by motor 23 provides a feedback signal through resistor 18 to counter amplifier 16. Servo motor 23 and tachometer generator 26 operate as a servo unit to generate a shaft rotation proportional to the altitude signal produced by receiver 13. The shaft of servo motor 23 mechanically drives a wiper positioned on potentiometer 32 and provides a signal directly proportional to altitude to resistor 42 of summation circuit 4. Winding 29 of tachometer generator 26 provides a signal proportional to the rate of shaft rotation of servo unit which is also proportional to the altitude rate and feeds the signal to resistor 41 of summation circuit 4. Winding 29 also furnishes a feedback rate signal to amplifier 21 for servo damping. Normal accelerometer 45 measures the acceleration of the aircraft in the yaw axis and feeds the acceleration signal to resistor 43 of summation circuit 4. The altitude and altitude rate signals provided by servo unit 2 are combined with the acceleration signal provided by accelerometer 45 and summed in resistors 41, 42 and 43 of summation circuit 4. The output of summation circuit 4 is an error signal indicating deviation of the aircraft from the predetermined flight path. This error signal is fed into amplifier 51 of integrator 5 which amplifies the signal and feeds it into demodulator 52. The demodulated output of demodulator 52 is integrated by resistor 53 and capacitor 54, and fed into modulator 55 which modulates a carrier signal provided from A.-C. source 56. The output from modulator 55 is an A.-C. signal proportional to the pitch angle required to maintain the aircraft on the predetermined glide path. A signal proportional to actual pitch angle is received from pitch angle gyro 6 and fed into resistor 64. Resistors 64 and 65 connected in common provide a summation circuit 7 which compares the actual pitch angle obtained from gyro 6 and the required pitch angle signal received from modulator 55. The output received by terminal 66 is then a signal which is the pitch error signal. Servo motor 23 turns cam 69 in proportion to altitude, and switch 70 is actuated when the aircraft reaches a predetermined altitude. Actuation of switch 70 closes normally open relay 68 connecting the output pitch error signal at terminal 66 to pitch controls 8 which cause the aircraft to move in accordance with the error signal.

Figure 6:
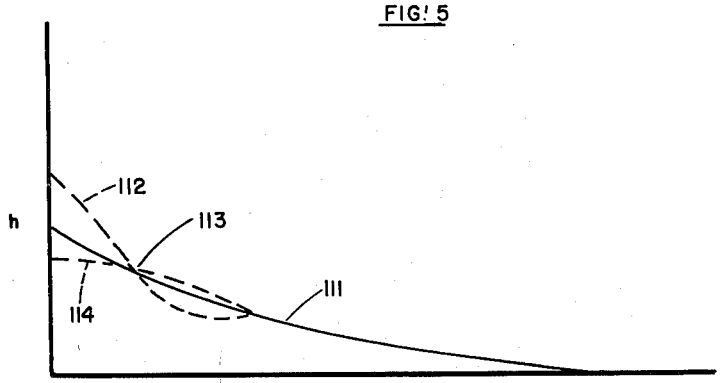
FIG. 6 is a graph showing the actual landing flare path followed by an aircraft controlled by the landing control system of this invention.

In FIG. 6 a graph of the exponential path required to land the aircraft is shown. Path 111 which represents the exponential curve described by the equation $$h + \frac{k_1 dh}{dt} + \frac{k_2 d^2h}{dt^2} = 0$$

is used as the reference curve to determine the flare path signal. Assuming the aircraft to be approaching the landing strip according to the path described by line 111, which is a curve of the equation $$h + \frac{k_1 dh}{dt} + \frac{k_2 d^2h}{dt^2} = 0$$

the output signal from summation circuit 4 of FIG. 1 which sums the altitude, altitude rate, and acceleration of the aircraft, will be zero. Therefore, integrator 5 receives a pitch command signal from radio controls 9 only, integrates it, and supplies a pitch command signal to summation circuit 7. The actual pitch angle signal received from pitch angle gyro 6 and fed into summation circuit 7 should then be equal to the pitch command signal received from integrator 5, since in normal operation radio command 9 directly controls the pitch angle by means not a part of this invention. Since the radio pitch angle command signal output from integrator 5 will be equal to the actual pitch angle signal from pitch angle gyro 6, no pitch angle error signal will be received by automatic pilot controls 8. Now assume the aircraft is approaching the landing strip according to the path described by line 112, a steep path which must be corrected. When the aircraft reaches point 113, the flare trigger point where the automatic landing system is initiated, an error signal obtained from summation circuit 4 is integrated by integrator 5 along with the pitch angle signal from radio command 9 and is presented to summation circuit 7 which indicates the necessary pitch angle for the aircraft. Comparing the pitch angle command signal received from integrator 5 with the actual pitch angle signal from vertical gyro 6 produces a pitch error signal to automatic pilot controls 8, causing the aircraft to decrease its pitch angle to correct its steep approach and tend to conform to path 111. In line 114 it can be seen the aircraft is approaching at an angle which is not steep enough. The pitch command signal obtained from integrator 5 compared with the present pitch angle signal from vertical gyro 6 provides an output signal to pitch controls 8 which controls the pitch angle of the aircraft so that the aircraft commences a steeper glide to conform to line 111.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An automatic landing system for aircraft comprising means disposed in said aircraft for measuring the distance between said aircraft and ground, means responsive to the output of said distance measuring means for differentiating said output, means for measuring the vertical acceleration of said airplane, means for summing the output of said distance means, the output of said differentiating means, and the output of said vertical acceleration means, gyro means for measuring the actual pitch angle of said aircraft, and means responsive at least to the outputs of said summing means and said gyro means to provide a comparison signal indicating the angle of pitch error of said aircraft.

2. An automatic landing system for aircraft comprising means disposed in said aircraft for measuring the distance between said aircraft and ground, means responsive to the output of said distance measuring means for differentiating said output, means for measuring the vertical acceleration of said airplane, means for summing the output of said distance means, the output of said differentiating means, and the output of said acceleration means, gyro means for measuring the actual pitch angle of said aircraft, means providing a pitch angle command signal, and means responsive at least to the outputs of said summing means, said gyro means, and said pitch command means to provide a comparison signal indicating the angle of pitch error of said aircraft.

3. An automatic landing system for aircraft comprising means disposed in said aircraft for measuring the distance between said aircraft and ground, means responsive to the output of said distance measuring means for differentiating said output, means for measuring the vertical acceleration of said airplane, means for summing the output of said distance means, the output of said differentiating means, and the output of said acceleration means, gyro means for measuring the actual pitch angle of said aircraft, means providing a pitch angle command signal, a rate gyro, and means responsive at least to the outputs of said summing means, said gyro means, said pitch command means, and said rate gyro to provide a comparison signal indicating the angle of pitch error of said aircraft.

4. An automatic landing system for aircraft comprising an altimeter providing a signal indicating the altitude of said aircraft, means for differentiating the output of said altimeter to produce an altitude rate signal, accelerometer means providing a signal indicating the vertical acceleration of said aircraft, summation means for combining said altitude signal, altitude rate signal, and acceleration signal, control means for indicating a present pitch angle command signal, means for integrating the output of said summation means combined with the output of said control means, the output of said integrating means being a pitch command signal, gyro means for measuring the actual pitch angle of said aircraft, and means for comparing said pitch command signal with the output of said gyro means to produce a pitch angle command signal for said aircraft.

5. Claim 2 as described wherein said differentiating means comprises a servo unit with at least a motor and a generator connected to be responsive to said motor, said generator having windings, the output of said winding producing a signal proportional to the rate of change of the altitude of said aircraft.

6. Means for controlling the rate of descent of an aircraft according to a predetermined path in space comprising means for measuring the altitude of said aircraft, servo means connected to be responsive to the output of said altitude measuring means, said servo means comprising an amplifier, a motor, a generator connected to said motor, and a shaft connected to said generator, said generator comprising winding means producing a signal proportional to altitude rate, a potentiometer having a wiper controlled by the shaft rotation of said servo means to produce a signal proportional to altitude, accelerometer means for measuring the vertical acceleration of said airplane, summing means connected to be responsive to said winding means, said potentiometer and said accelerometer means to produce a signal in accordance with the equation $$h + \frac{k_1 dh}{dt} + \frac{k_2 d^2 h}{dt^2} = 0$$

wherein $h$ is altitude and $$\frac{dh}{dt}$$

is altitude rate, and $$\frac{d^2 h}{dt^2}$$

is the acceleration, and $k_1$ and $k_2$ are predetermined constants.

7. Means for controlling the rate of descent of an aircraft comprising altitude measurement means producing an D.-C. signal proportional to the altitude of said aircraft, modulating means connected to be responsive to said altitude measuring means for converting said D.-C. signal to an A.-C. signal, a servo unit connected to be responsive to the output of said modulating means, said servo unit comprising at least a motor, a shaft, a generator connected to said motor through said shaft, the output of said generator producing a signal proportional to the altitude rate of said aircraft, the output of said shaft connected to a potentiometer having a wiper controlled by said shaft, the output of said potentiometer producing a signal proportional to the altitude of said aircraft, accelerometer means for measuring the vertical acceleration of said aircraft, means for summing said altitude, altitude rate, and acceleration signals, control means for indicating a present pitch angle command signal, means for integrating the combined output of said summing means and said control means, means for measuring the actual pitch angle of said aircraft, a rate gyro, and comparison means responsive to the output of said integrating means, said rate gyro and said actual pitch angle measurement means to produce a command signal proportional to the difference between said actual pitch angle and the output of said integrating means.

8. Claim 7 as described wherein said integrating means comprises an amplifier connected to receive the output of said summing means, a demodulator responsive to the output of said amplifier to convert the A.-C. signal to a D.-C. signal, an R.-C. circuit for integrating said D.-C. signals, and a modulator circuit connected to be responsive to the output of said R.-C. circuit to produce an A.-C. signal.

9. Claim 7 as described wherein said summing means comprises three resistors connected in common at one end of each of said resistors, the other end of the first of said resistors connected to receive said altitude rate signal, the other end of the second of said resistors connected to receive said altitude signal, and the other end of the third of said resistors connected to receive said acceleration signal.

References Cited in the file of this patent

UNITED STATES PATENTS

| | | |
|---|---|---|
| 1,436,280 | Minorsky | Nov. 21, 1922 |
| 2,226,930 | Hefele | Dec. 31, 1940 |
| 2,415,429 | Kellogg | Feb. 11, 1947 |
| 2,548,278 | Wirkler | Apr. 10, 1951 |
| 2,613,350 | Kellogg | Oct. 7, 1952 |
| 2,613,352 | Kellogg | Oct. 7, 1952 |
| 2,627,384 | Esval | Feb. 3, 1953 |
| 2,830,291 | Hecht | Apr. 8, 1958 |
| 2,841,345 | Halpert | July 1, 1958 |
| 2,896,145 | Snodgrass | July 21, 1959 |